(12) United States Patent
Southwick

(10) Patent No.: US 10,094,207 B2
(45) Date of Patent: Oct. 9, 2018

(54) OIL PRODUCTION USING MULTISTAGE SURFACTANT POLYMER CHEMICAL FLOOD

(71) Applicant: SHELL OIL COMPANY, Houston, TX (US)

(72) Inventor: Jeffrey George Southwick, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/538,424

(22) PCT Filed: Dec. 21, 2015

(86) PCT No.: PCT/US2015/067137
§ 371 (c)(1),
(2) Date: Jun. 21, 2017

(87) PCT Pub. No.: WO2016/106230
PCT Pub. Date: Jun. 30, 2016

(65) Prior Publication Data
US 2018/0002591 A1    Jan. 4, 2018

Related U.S. Application Data

(60) Provisional application No. 62/095,918, filed on Dec. 23, 2014.

(51) Int. Cl.
*E21B 43/20* (2006.01)
*C09K 8/584* (2006.01)

(52) U.S. Cl.
CPC .............. *E21B 43/20* (2013.01); *C09K 8/584* (2013.01)

(58) Field of Classification Search
None
See application file for complete search history.

(56) References Cited

U.S. PATENT DOCUMENTS

| 3,990,515 | A | | 11/1976 | Wilchester et al. | |
|---|---|---|---|---|---|
| 4,261,812 | A | * | 4/1981 | Newcombe | C10G 33/04 166/267 |
| 4,266,611 | A | | 5/1981 | Bousaid et al. | |
| 4,706,749 | A | * | 11/1987 | Hayes | E21B 43/40 166/267 |
| 9,315,716 | B2 | * | 4/2016 | Steinbrenner | C09K 8/584 |

(Continued)

OTHER PUBLICATIONS

International Search Report and Written Opinion received for PCT Patent Application No. PCT/US2015/067137, dated Mar. 31, 2016, 10 pages.

(Continued)

*Primary Examiner* — Anuradha Ahuja

(57) ABSTRACT

A process for recovering oil from an oil-bearing formation is disclosed comprising providing a first oil recovery formulation comprising a first surfactant able to create low interfacial tension with reservoir crude oil; injecting the first oil recovery formulation into the oil-bearing formation via an injection well (201); providing a second oil recovery formulation having a second surfactant with a higher solubility in water than the first formulation; injecting the second oil recovery formulation into the oil-bearing formation via the injection well; and producing oil to a production well (203).

5 Claims, 2 Drawing Sheets

(56) References Cited

U.S. PATENT DOCUMENTS

| | | | |
|---|---|---|---|
| 2009/0183877 A1* | 7/2009 | Quintero | C09K 8/584 166/300 |
| 2011/0083847 A1* | 4/2011 | Bittner | C09K 8/584 166/270.1 |
| 2011/0263467 A1 | 10/2011 | Bittner et al. | |
| 2012/0097389 A1 | 4/2012 | Dwarakanath et al. | |
| 2014/0051609 A1* | 2/2014 | Southwick | E21B 43/16 507/225 |
| 2017/0183559 A1* | 6/2017 | Barnes | C09K 8/584 |

OTHER PUBLICATIONS

"Enordet surfactants for enhanced oil recovery—Producing more from your current operations", Shell Chemicals, Retrieved from the Internet—URL:http://s08.static-shell.com/content/dam/shell-new/local/business/chemicals/downloads/pdf/products-services/our-products/enordet-surfactants-eor5.pdf, Apr. 30, 2013, 12 pages, XP055260090.

Nelson, "The Salinity-Requirement Diagram—A Useful Tool in Chemical Flooding Research and Development", Society of Petroleum Engineers, SPE-8824-PA, vol. 22, Apr. 1982, pp. 259-270.

Trine et al., "Chemical EOR for Offshore Platforms Using a Novel Chemical Gradient Design", Society of Petroleum Engineers, SPE-175130-MS, 2015, 16 pages.

\* cited by examiner

OIL PRODUCTION USING MULTISTAGE SURFACTANT POLYMER CHEMICAL FLOOD

CROSS REFERENCE TO EARLIER APPLICATION

The present application is a National Stage (§ 371) application of PCT/US2015/067137, filed Dec. 21, 2015, and claims the benefit of U.S. Provisional Application No. 61/095,918, filed Dec. 23, 2014, the disclosure of which is incorporated by reference herein.

FIELD OF THE INVENTION

The present invention is directed to processes for producing hydrocarbon-containing compositions from an oil-bearing formation and, more particularly, to recovering hydrocarbons from an oil-bearing formation using an aqueous recovery formulation.

BACKGROUND OF THE INVENTION

In the recovery of oil from a subterranean formation, primary recovery methods utilizing the natural formation pressure to produce the oil typically allow recovery of only a portion of the oil contained within the formation. Additional oil and hydrocarbon compounds from the formation may be produced by improved or enhanced oil recovery (EOR) methods.

One enhanced oil recovery method utilizes a surfactant-polymer ("SP") flood in an oil-bearing formation to increase the amount of oil recovered from the formation. An aqueous dispersion of a surfactant and a polymer is injected into an oil-bearing formation to increase recovery of oil from the formation, either after primary recovery or after a secondary recovery waterflood. The SP flood enhances recovery of oil from the formation by lowering interfacial tension between oil and water phases in the formation, thereby mobilizing the oil for production. In an SP flood, the polymer increases the viscosity of the SP fluid, typically to the same order of magnitude as the oil in the formation, so the mobilized oil may be forced through the formation for production by the SP flood.

In conventional SP oil recovery processes, the SP oil recovery formulation is typically designed to produce a low interfacial tension (IFT) between oil and water in the formation, often resulting in a stable microemulsion of oil and water in the formation. The microemulsion indicates very low IFT. The microemulsion may aid in mobilizing hydrocarbons for displacement through the formation and toward a production well for production and recovery from the formation.

In some cases, the SP oil recovery formulation may be designed to produce a low IFT between oil and water in the formation by selecting or tailoring one or more surfactants of the oil recovery formulation to induce the formation of a stable oil-water microemulsion at the salinity of the formation water. Although the microemulsion does not need to have a salinity matching formation water, the interfacial tension between formation oil and water in the presence of an SP oil recovery formulation is sensitive to the salt concentration of the aqueous SP dispersion and the salt concentration of water in the formation. An SP oil recovery formulation may be formulated by adapting the total salt concentration of the oil recovery formulation to match the total salt concentration of water in the oil-bearing formation into which the oil recovery formulation is to be introduced, and selecting or tailoring the one or more surfactants used in the oil recovery formulation to induce the formation of a stable oil-water microemulsion, indicative of a low oil/water interfacial tension. Alternatively, surfactant and polymer may be added directly to the produced water from the reservoir. The resulting SP oil recovery formulation is then injected into the oil-bearing formation to enhance oil recovery from the formation.

A limiting factor in using SP enhanced oil recovery is loss of surfactant from the oil recovery formulation to the formation. A portion of the surfactant of the SP oil recovery formulation may be adsorbed from the oil recovery formulation by the formation minerals and clays upon injection into the formation. Loss of surfactant to the formation decreases the surfactant concentration in the SP oil recovery formulation. While the total dissolved solids (TDS) concentration remains substantially unchanged as surfactant is lost to the formation, the ratio of total dissolved solids to surfactant increases and causes the surfactant to be relatively more soluble in oil than brine, referred to as "going over-optimum" (which has a high IFT between oil and water). In addition, higher levels of divalent cations in the SP oil recovery formulation compound this effect. Using an "over-optimum" SP oil recovery formulation is known to result in lower oil recovery. See Richard C. Nelson, The Salinity-Requirement Diagram—A Useful Tool in Chemical Flooding Research and Development, 22 Soc. OF PET. ENG. J. at 259-270 (1982). Lowering the salinity of the SP oil recovery formulation during the latter part of chemical injection may allow the SP oil recovery formulation to mix with the preceding injection fluid and stay in an "optimum" microemulsion region for a longer period of time during the flood. However, in off-shore operations, seawater is typically the primary, and often only, source of brine for the SP oil recovery formulation. As such, there may be limited ability to adjust the salinity of the brine without using expensive and/or inefficient filtering processes.

Improvements to existing SP enhanced oil recovery processes and compositions are desirable. In particular, processes and compositions effective to enhance oil recovery from an oil-bearing formation utilizing an SP oil recovery formulation that can keep the SP oil recovery formulation in an optimum microemulsion (low IFT) region or bring the SP oil recovery formulation back into an optimum microemulsion region without needing to change the total dissolved solids of the brine component are desirable.

SUMMARY OF THE INVENTION

In one aspect, the present invention is directed to a process for recovering oil from an oil-bearing formation, comprising: providing a first oil recovery formulation comprising a first surfactant able to create an oil-water interfacial tension less than 0.01 mN/m in a mixture of the first oil recovery formulation and oil of the formation; injecting the first oil recovery formulation into the oil-bearing formation via an injection well; providing a second oil recovery formulation comprising a second surfactant, where the second surfactant has a higher solubility in water than the first surfactant; injecting the second oil recovery formulation into the oil-bearing formation via the injection well; and producing oil to a production well after injection of the first oil recovery formulation and the second oil recovery formulation into the formation.

In another aspect, the present invention is directed to a process for recovering oil from an oil-bearing formation, comprising: providing a first oil recovery formulation comprising a first water and a first surfactant formulation mixed in the first water, wherein the first oil recovery formulation is effective to form a type-III Winsor microemulsion in a mixture with oil of the formation; introducing the first oil recovery formulation into the oil-bearing formation; adsorbing surfactant from the first oil recovery formulation into the oil-bearing formation, wherein sufficient surfactant is adsorbed from the first oil recovery formulation to remove a mixture of the first oil recovery formulation and oil of the formation from a type-III Winsor microemulsion environment; providing a second oil recovery formulation comprising a second water and a second surfactant formulation mixed in the second water, wherein the second surfactant formulation is more hydrophilic that the first surfactant formulation; combining the second oil recovery formulation with the mixture of the first oil recovery formulation and oil within the oil-bearing formation to form a type-III Winsor microemulsion; and producing oil from the oil-bearing formation after combining the first oil recovery formulation and the second oil recovery formulation with oil in the oil-bearing formation.

BRIEF DESCRIPTION OF THE DRAWINGS

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE INVENTION

The present invention is directed to processes for producing hydrocarbon-containing compositions from an oil-bearing formation and, more particularly, to recovering hydrocarbons from an oil-bearing formation using an aqueous recovery formulation.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention.

Certain embodiments may comprise preparing a first oil recovery formulation that is a Surfactant-Polymer (SP) oil recovery formulation. The first oil recovery formulation may be prepared with a first surfactant formulation comprised of one or more surfactants wherein the total dissolved salt concentration of the first oil recovery formulation is equal to or greater than 1000 ppmw ("parts per million, by weight") (0.1 wt. %) to 30,000 ppmw (3.0 wt. %) less than the optimum total dissolved salt concentration for the surfactant formulation, where the optimum total dissolved salt concentration for the surfactant formulation is the total dissolved salt concentration at which the surfactant formulation produces a minimum interfacial tension in a brine/oil mixture as demonstrated by the formation of a type-III Winsor microemulsion. The brine/oil mixture may be a mixture of oil and brine of an oil-bearing formation in which the first oil recovery formulation will be utilized to recover oil from the formation. In certain embodiments, the first oil recovery formulation may comprise at least 50 ppm divalent cations.

Figure 1:
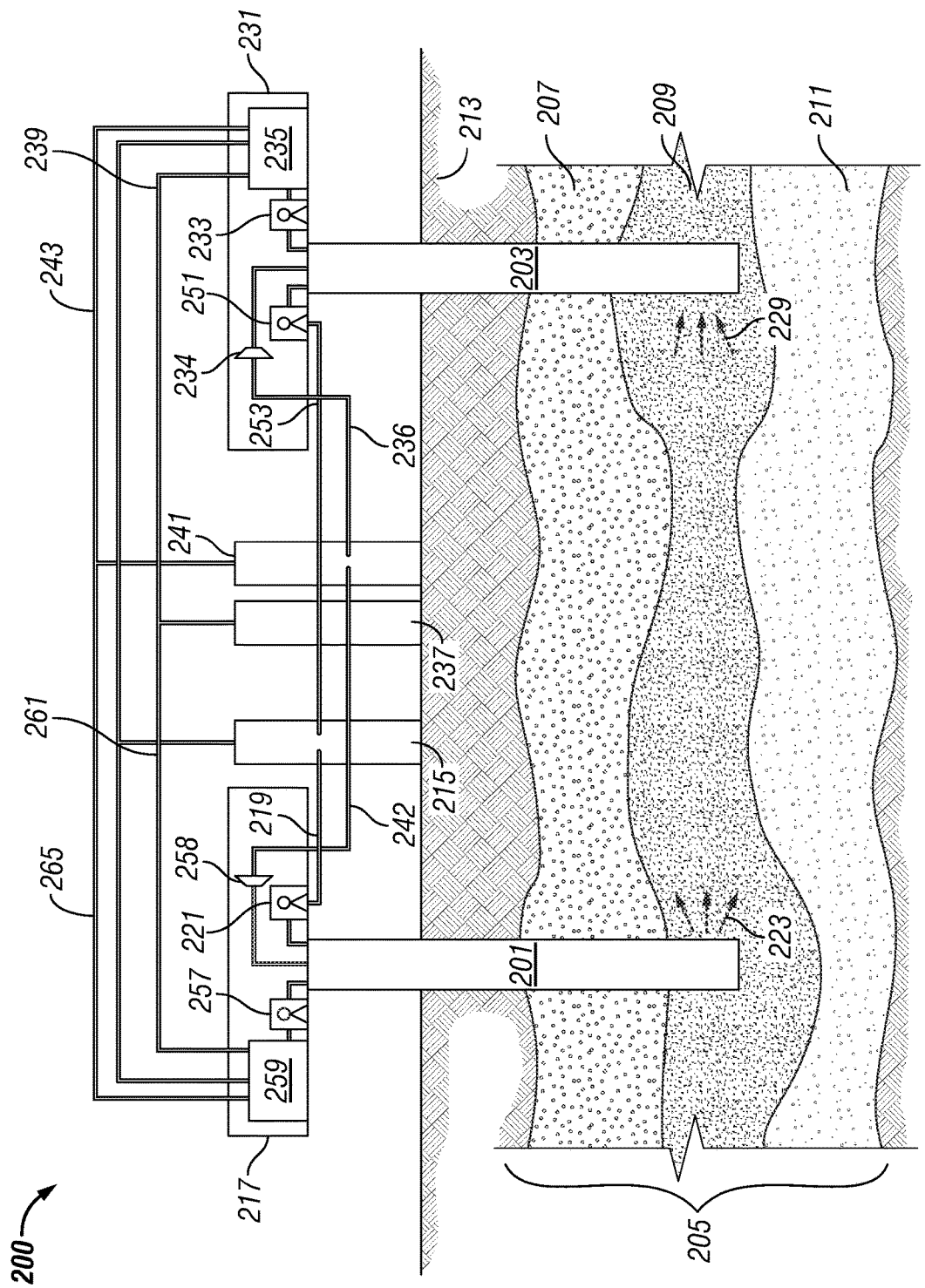
FIG. 1 shows an illustrative hydrocarbon production system, according to aspects of the present disclosure.

Referring now to FIG. 1, in certain embodiments, the first oil recovery formulation may be used to recover oil from an oil-bearing formation by injecting the first oil recovery formulation into an oil-bearing formation 209 via an injection well 201. The first oil recovery formulation may mobilize oil toward a production well 203 for production from the oil-bearing formation, where a significantly greater portion of the mobilized oil may be produced from the oil-bearing formation as oil from an oil bank, rather than in a microemulsion of oil and water, compared to conventional oil recovery processes. Once produced through the production well 203, oil from the produced oil bank may be separated from water produced from the formation without substantial demulsification efforts as required to separate produced oil from a microemulsion of oil and water.

Figure 2:
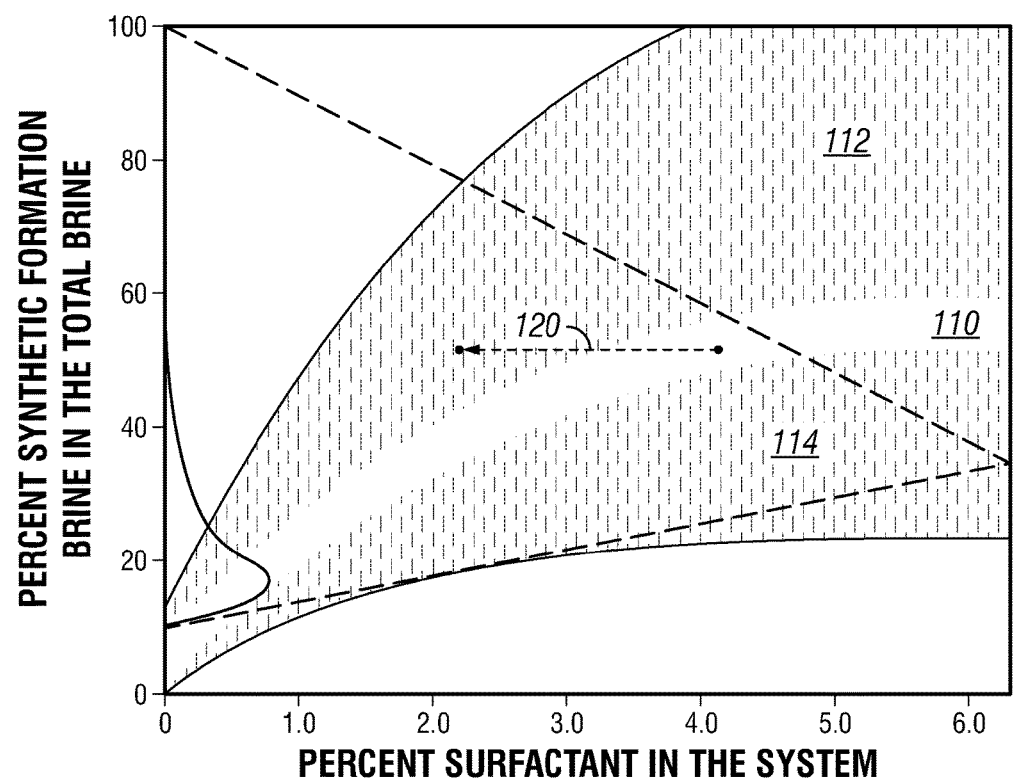
FIG. 2 shows an illustrative graph for an example oil recovery formulation showing the relationship between microemulsion type and surfactant and salinity concentrations, according to aspects of the present disclosure.

Referring now to FIG. 2, an illustrative graph is shown for an SP oil recovery formulation in an oil-bearing formation, containing three regions of behavior: an optimum region 110, an over-optimum region 112, and an under-optimum region 114. In the over-optimum region, the surfactant has a higher relative solubility in the oil than the water of the microemulsion. So, when an SP oil recovery formulation is in the over-optimum region, more surfactant is dissolved into the oil component than the water component of a mixture of oil and the oil recovery formulation. In the over-optimum region, an SP oil recovery formulation may be described as a Winsor type-II microemulsion. In the under-optimum region, the surfactant is more soluble in water than oil, so a mixture of oil and the oil recovery formulation contains more surfactant in the water than in oil. In the under-optimum region, an SP oil recovery formulation may be described as a Winsor type-I microemulsion. In the optimum region, the surfactant is substantially equally soluble in both oil and water, so oil and water components of the microemulsion may comprise substantially equal amounts of the surfactant. In the optimum region, an SP oil recovery formulation may promote low interfacial tension (low IFT) with a mixture of brine and oil contained within the formation. In the optimum region, an SP oil recovery formulation may be described as a Winsor type-III microemulsion. In certain embodiments, injecting an SP oil recovery formulation that promotes a low IFT with a mixture of formation oil and brine may aid in oil recovery to the production well.

In certain embodiments, the first oil recovery formulation may comprise a first water, a polymer, and a first surfactant formulation. The first oil recovery formulation may have a first surfactant formulation composition, a first surfactant concentration, and a total dissolved solids concentration in the optimum region (i.e., the first oil recovery formulation may form a Winsor type-III microemulsion with oil of the oil-bearing formation).

The first oil recovery formulation may be injected into the oil-bearing formation. After injection into the formation, the first oil recovery formulation may form a mixture with oil present in the formation. A portion of the surfactant of the first oil recovery formulation may adsorb from the mixture of formation oil and the first oil recovery formulation on to the formation, decreasing the concentration of surfactant in the mixture while the total dissolved solids content of the mixture remains substantially constant. As a result, the mixture of the formation oil and the first oil recovery formulation may transition from the optimum region 110 to the over-optimum region 112 (i.e., move from a Winsor type-III microemulsion to a Winsor type-II microemulsion). For example, the first oil recovery formulation with constant total dissolved solids may have an initial surfactant concentration of 4.0 wt. % and a surfactant concentration of 2.0 wt. % after adsorption of surfactant on to the formation. The change in surfactant concentration (shown in FIG. 2 by arrow 120) may bring the mixture of the formation oil and the first oil recovery formulation into the over-optimum region 112.

A second oil recovery formulation comprised of a second water, a polymer, and a second surfactant formulation may be injected into the oil-bearing formation and interact with the mixture of formation oil and the first oil recovery formulation that has transitioned towards an over-optimum type-II Winsor microemulsion to form a mixture of formation oil and a combined first and second oil recovery formulation having a sufficiently low interfacial tension to mobilize oil for displacement through the formation for production from the formation. For example, the mixture of formation oil and the combined oil recovery formulation may have an interfacial tension of $10^{-3}$ mN/m to $10^{-2}$ mN/m. For example, the mixture of formation oil and the combined oil recovery formulation may comprise a Windsor type-III microemulsion within the optimum region 110, and injection of the second oil recovery formulation into the formation may transition the mixture of the formation oil and the first oil recovery formulation from which surfactant has been adsorbed by the formation from a type-II Winsor microemulsion to a type-III Winsor microemulsion.

The second oil recovery formulation may comprise a surfactant having a higher solubility in water than the surfactant in the first oil recovery formulation. In certain embodiments, the second oil recovery formulation may comprise more than one surfactant. A mixture of formation oil with the second oil recovery formulation may be in the under-optimum region (i.e., characterized as a Winsor type-I microemulsion, where the surfactant is more soluble in water than oil). For example, the second oil recovery formulation may comprise a surfactant mixture may comprise the first surfactant from the first oil recovery formulation and a second surfactant, where the mixture of the first and second surfactants is more water soluble than the first surfactant alone. In certain embodiments, the second oil recovery formulation may comprise only a second surfactant that is more water-soluble than the first surfactant.

In certain embodiments, the second oil recovery formulation may form an under-optimum Winsor type-I microemulsion upon being mixed with formation oil and the first oil recovery formulation may form an over-optimum Winsor type-II microemulsion upon being mixed with formation oil. In certain embodiments, the first oil recovery formulation may mix with the second oil recovery formulation to give a combined oil recovery formulation that upon mixing with formation oil forms a Winsor type-III microemulsion.

In certain embodiments, the first oil recovery formulation and/or the second oil recovery formulation may comprise a mixture of at least two surfactants. A mixture of the surfactants may form mixed micelles and function as a blend in relation to the relative mass of the mixture. For example, in certain embodiments, the surfactants of the first and/or the second oil recovery formulation may comprise an alkyl propylene ether sulfate (e.g., ENORDET™ J771, available from Shell Chemicals) and/or a 15-18 carbon internal olefin sulfonate (e.g., ENORDET™ O332, available from Shell Chemicals).

Table 1 shows the NaCl concentration needed for these surfactants to create a Winsor type-III microemulsion, as determined with decane as the oil phase. In some embodiments, the optimal salinity range results from a slight variability in the manufacture of the products. Table 1 shows the range of NaCl salinity needed to form a Winsor Type III phase environment. It is seen that ENORDET™ O332 is more hydrophilic than ENORDET™ J771 since more NaCl is necessary to reduce the water solubility of the surfactant and to form a Winsor Type III microemulsion.

| Surfactant | TDS concentration to create Winsor Type III microemulsion (% NaCl) with an equal volume of Decane |
| --- | --- |
| ENORDET ™ J771 | 1.25-2.0% |
| ENORDET ™ O332 | 10-12% |

The relative water solubility of the surfactant blend for use in the first and/or second oil recovery formulation may be adjusted by changing the ratio of the surfactants mixed in the formulation. The first oil recovery formulation may be prepared with a first surfactant formulation effective to provide a mixture of the first oil recovery formulation and formation oil with a low interfacial tension. A mixture of an oil recovery formulation and formation oil may be considered to have a low interfacial tension, e.g. form a type-III Winsor microemulsion, when the mixture has an interfacial tension in the range of $10^{-3}$ mN/m to $10^{-2}$ mN/m. For example, in certain embodiments, a 3:1 ratio of ENORDET™ J771 to ENORDET™ O332 may create a Winsor type III microemulsion with seawater and a low viscosity Malaysian crude oil. For example, in certain embodiments, the first oil recovery formulation may comprise a brine or seawater containing a polymer and a first surfactant formulation having a 3:1 ratio of ENORDET™ J771 to ENORDET™ O332. The brine or seawater of the first oil recovery formulation may have a total dissolved solids content that is substantially the same as the total dissolved solids content of water within the formation, e.g. the brine or seawater of the first oil recovery formulation may have a total dissolved solids content with 10 wt. % of the total dissolved solids content of the formation water.

The second oil recovery formulation may be prepared with a second surfactant formulation effective to form a type-I Winsor microemulsion in a mixture of the second oil recovery formulation and formation oil. For example, in certain embodiments, a 1.5 to 1.0 ratio of ENORDET™ J771 to ENORDET™ O332, respectively, may produce a Winsor type I microemulsion with seawater and Malaysian crude oil. In certain embodiments, the second oil recovery formulation may comprise 75% to 25% ENORDET™ J771. In certain embodiments the second oil recovery formulation may comprise 25% to 75% ENORDET™ O332. For example, in certain embodiments, the second oil recovery formulation may comprise a polymer and a 1.5:1.0 ratio of ENORDET™ J771 to ENORDET™ O332, respectively, or for example, the second oil recovery formulation may comprise a polymer and a 1:3 ratio of ENORDET™ J771 to ENORDET™ O332, respectively.

The second oil recovery formulation may have substantially the same total dissolved solids concentration as the first oil recovery formulation. For example, the second oil recovery formulation may have a total dissolved solids concentration within 10% of the total dissolved solids concentration of the first oil recovery formulation. In certain embodiments, the first and second oil recovery formulations may comprise an aqueous fluid obtained from a common source water (for example, the source water may be selected from seawater, brackish water, estuarine water, aquifer water, well water, lake water, and/or river water). In certain embodiments, the TDS of the first and second oil recovery formulations may be obtained from the source water. The first water of the first oil recovery formulation and the second water of the second oil recovery formulation may be obtained from the same source water, and the first water and the second water may have substantially the same TDS concentration.

The TDS concentration of the first and second oil recovery formulations may be substantially the same as the TDS concentration of formation water. The TDS concentration of the first and second oil recovery formulations may be within 10% of the TDS concentration of the formation water. The invention of the present disclosure, however, is not limited to setting or adjusting the TDS concentration of the first and/or second oil recovery formulations with respect to the TDS concentration of formation water. As such, in certain embodiments, the TDS concentration of the first and second oil recovery formulations may be determined primarily by the TDS concentration of the source water. For example, in certain embodiments, divalent ions and/or monovalent ions may not be removed from the source water prior to its use in the first and/or second oil recovery formulation. In certain embodiments, a nanofiltration device and/or a reverse osmosis device may be used to remove dissolved solids from the source water prior to use in the first and/or second oil recovery formulation.

In certain embodiments, a third oil recovery formulation may be injected into the formation after injection of the first and second oil recovery formulations into the formation and mixed with the mixture of formation oil, formation water, and combined first and second oil recovery formulations. In certain embodiments, the third oil recovery formulation may form a mixture with formation oil having an interfacial tension and/or Winsor microemulsion type substantially similar to the second oil recovery formulation. The present disclosure does not intend to limit the number of parts the oil recovery formulation may be split into for injection into the formation. Instead, it is contemplated that any number of formulations may be injected into the formation to create a combined oil recovery formulation having a low interfacial tension when mixed with formation oil and formation water, sufficient to mobilize oil within the formation for displacement within the formation toward a production well.

To prepare the first oil recovery formulation and/or the second oil recovery formulation, the source water may be mixed with a surfactant formulation comprising at least one surfactant and a polymer.

The first (optimum) oil recovery formulation may comprise a first surfactant formulation in a concentration that is effective to form a type-III Winsor microemulsion upon mixture with formation oil. Formation of a type-III Winsor microemulsion is indicated by the formation of a stable liquid 3-phase system having an aqueous phase layer, a microemulsion layer, and an oil phase layer. Formation of a type-III Winsor microemulsion indicates that the interfacial tension in the brine-surfactant-oil mixture is at or near a minimum and the surfactant formulation is effective to produce low interfacial tension between the oil and the brine at the salinity of the brine. Low interfacial tension between the oil and brine is defined herein as a surface tension of 0.01 mN/m or less.

In order to determine whether a surfactant formulation is effective to form a type-III Winsor emulsion with oil, the oil recovery formulation may be combined with oil and mixed together and then allowed to settle and stabilize. The mixture may be heated to a temperature within a range of temperatures within the oil-bearing formation. For example, the mixture may be heated to a temperature within 10° C. of the temperature of the oil-bearing formation. In an embodiment, the mixture may be heated to a temperature from 40° C. to 90° C. either prior to mixing or upon mixing the oil and oil recovery formulation. The mixture may be allowed to equilibrate, typically by allowing the mixture to settle over a period of 1 to 2 days. The mixture may be allowed to equilibrate while maintaining the mixture at a temperature within a range of temperatures within the oil-bearing formation or within 10° C. of a determined formation temperature, typically in a range of from 40° C. to 90° C. The equilibrated mixture may then be observed to determine whether a stable liquid 3-phase type-III Winsor microemulsion has formed.

The first and second oil recovery formulations may be comprised of one or more surfactants, where a surfactant useful in the surfactant formulation may be any surfactant effective to reduce the interfacial tension between oil and water in the oil/brine mixture and in the oil-bearing formation. In certain embodiments, a surfactant in the surfactant formulation may be an anionic surfactant. For example, the anionic surfactant may be a sulfonate-containing compound, a sulfate-containing compound, a carboxylate-containing compound, a phosphate-containing compound, or a blend thereof. For example, an anionic surfactant in the surfactant formulation may be an alpha olefin sulfonate compound, an internal olefin sulfonate compound, a branched alkyl benzene sulfonate compound, an alkyl propylene oxide sulfate compound, an alkyl ethylene oxide sulfate compound, an alkyl propylene oxide-ethylene oxide sulfate compound, or a blend thereof. The anionic surfactant may contain from 12 to 28 carbons, or from 12 to 20 carbons. A surfactant of the surfactant formulation may comprise an internal olefin sulfonate compound containing from 15 to 18 carbons or an alkyl propylene oxide sulfate compound containing a 12 to 15 carbon hydrophobe, or a blend thereof, where the blend contains a volume ratio of the alkyl propylene oxide sulfate to the internal olefin sulfonate compound of from 1:1 to 10:1.

The first oil recovery formulation may be formed of one or more surfactants selected such that when mixed with oil from an oil-bearing formation the first oil recovery formulation has an low interfacial tension sufficiently low to mobilize the oil within the formation for displacement of the oil towards a production well. For example, the first oil recovery formulation may have an interfacial tension of between $10^{-3}$ mN/m to $10^{-2}$ mN/m upon being mixed with oil of the formation. For example, the first oil recovery formulation may form a type-III Winsor microemulsion upon being mixed with oil of the formation.

In certain embodiments, surfactants having more hydrophilic character may be mixed with surfactants having more hydrophobic character, and the quantities of each may be adjusted to improve the microemulsion-forming effectiveness of the surfactant mixture. Surfactants having more hydrophilic character and surfactants having more hydrophobic character may be identified by those having skill in the art. For example, surfactants containing significant quantities of 12-15 carbon alkyl 7-propylene oxide sulfate are known to be hydrophobic. Preferably, the surfactant formulation will have a more hydrophilic character to obtain ultra-low IFT with a specific formation oil, and so that the formation of viscous emulsions may be avoided upon introducing the oil recovery formulation into the oil-bearing formation.

An amount of surfactant formulation may be mixed in the first oil recovery formulation effective to permit the identification of the formation of a type-III Winsor microemulsion upon mixing with oil from a formation. For example, the surfactant formulation may be present in the mixture of first oil recovery formulation and formation oil such that the amount of surfactant formulation in the mixture is from 0.05 wt. % to 5 wt. %, or from 0.1 wt. % to 3 wt. %.

After identifying a first surfactant formulation effective to form a type-III Winsor microemulsion in the mixture of formation oil and brine, the first oil recovery formulation may be prepared utilizing the identified first surfactant formulation. The first oil recovery formulation is prepared by mixing together the identified first surfactant formulation, a first water, a polymer, and optionally a co-solvent. The identified surfactant formulation, first water, polymer, and/or co-solvent may be mixed according to any conventional mixing method for mixing liquids, optionally with particulate dissolvable solids, for example by mixing in a mechanically stirred tank.

The first water utilized to prepare the first oil recovery formulation may be formation water produced from the oil-bearing formation. Alternatively, the first water may be fresh water or brine that may be provided from source water selected from seawater, estuarine water, aquifer water, lake water, river water, or brackish water. The total dissolved salt concentration of the first water that is from a source water other than formation water may be adjusted to provide the first oil recovery formulation with a total dissolved salt concentration of greater than 5000 ppm. In certain embodiments, the total dissolved salt concentration of the first oil recovery formulation may comprise at least 50 ppm divalent cations.

The first oil recovery formulation may comprise one or more water soluble polymers. One or more water soluble polymers may be mixed with the first water, the first surfactant formulation, and optionally a co-solvent, to provide the first oil recovery formulation. The one or more water soluble polymers utilized to form the first oil recovery formulation may be selected from the group consisting of polyacrylamides; partially hydrolyzed polyacrylamides; polyacrylates; ethylenic co-polymers; biopolymers; carboxymethylcelluloses; polyvinyl alcohols; polystyrene sulfonates; polyvinylpyrrolidones; AMPS (2-acrylamide-methyl propane sulfonate); co-polymers of acrylamide, acrylic acid, AMPS, and n-vinylpyrrolidone in any ratio; and combinations thereof. Examples of ethylenic co-polymers include co-polymers of acrylic acid and acrylamide, acrylic acid and lauryl acrylate, and lauryl acrylate and acrylamide. Examples of biopolymers include xanthan gum, guar gum, and scleroglucan.

The molecular weight average of the polymer in the first oil recovery formulation may be sufficient to provide sufficient viscosity to the first oil recovery formulation to drive mobilized oil through the formation. For example, in certain embodiments, the polymer may have a molecular weight average of at least 10000 daltons, or at least 50000 daltons, or at least 100000 daltons. The polymer may have a molecular weight average of from 10000 to 30000000 daltons, or from 100000 to 15000000 daltons.

The one or more water soluble polymers may be mixed in the first oil recovery formulation in an amount effective to provide the first oil recovery formulation with a viscosity on the same order of magnitude as the viscosity of oil in the oil-bearing formation under formation temperature conditions so the first oil recovery formulation may drive mobilized oil across the formation for production from the formation with a minimum of fingering of oil through the first oil recovery formulation and/or fingering of the first oil recovery formulation through the oil. The quantity of the polymer in the first oil recovery formulation may be sufficient to provide the first oil recovery formulation with a dynamic viscosity of at least 1 mPa s (1 cP), or at least 10 mPa s (10 cP), or at least 100 mPa s (100 cP), or at least 1000 mPa s (1000 cP) at 25° C. or at a temperature within a formation temperature range. The concentration of polymer in the first oil recovery formulation may be from 250 ppm to 10000 ppm, or from 500 ppm to 5000 ppm, or from 1000 to 2000 ppm.

Optionally, a co-solvent may be mixed with the first surfactant formulation, first water, and polymer to form the first oil recovery formulation. The co-solvent may be included in the first oil recovery formulation to inhibit the formation of a viscous emulsion upon deploying the first oil recovery formulation in the oil-bearing formation to recover oil therefrom. The co-solvent may be a low molecular weight alcohol including, but not limited to, methanol, ethanol, and iso-propanol, isobutyl alcohol, secondary butyl alcohol, n-butyl alcohol, t-butyl alcohol, or a glycol including, but not limited to, ethylene glycol, 1,3-propanediol, 1,2-propandiol, diethylene glycol butyl ether, triethylene glycol butyl ether, or a sulfosuccinate including, but not limited to, sodium dihexyl sulfosuccinate. If present, the co-solvent may comprise from 100 ppm to 50000 ppm, or from 500 ppm to 5000 ppm of the first oil recovery formulation. The first oil recovery formulation may be free of a co-solvent.

The second (under-optimum) oil recovery formulation may be comprised of substantially the same formulation as the first oil recovery formulation, except the second oil recovery formulation may comprise one or more surfactants selected to promote the formation of a type-I Winsor microemulsion upon the second oil recovery formulation being mixed with the formation oil, where the surfactants are comparably more soluble in water than oil. The second oil recovery formulation may otherwise be prepared in the same way the first oil recovery formulation is prepared, and comprises a second surfactant formulation, a second water, polymer, and optionally, a co-solvent as described above with regard to the first oil recovery formulation. As such, in certain embodiments, the first and second oil recovery formulations may be comprised of substantially the same components, except for the surfactant or surfactant formulation.

Referring again to FIG. 1, a system 200 for practicing the process of oil recovery of the present invention is shown. The system includes an injection well 201 and a production well 203 extending into an oil-bearing formation 205 such as described above. The oil-bearing formation 205 may be comprised of one or more formation portions 207, 209, and 211, located beneath an overburden 213.

A first (optimum) oil recovery formulation may be provided comprising a first surfactant formulation, a first water having a total dissolved salt concentration of greater than 5000 ppm, a polymer, and optionally a co-surfactant, as described above. The first oil recovery formulation may be provided from an oil recovery formulation storage facility 215 fluidly operatively coupled to an injection facility 217 via conduit 219. The injection facility 217 may be fluidly operatively coupled to the injection well 201, which may be located extending from the injection facility 217 into the oil-bearing formation 205. The first oil recovery formulation may flow from the injection facility 217 through the first well to be introduced into the formation 205, for example in formation portion 209, where the injection facility 217 and the first well, or the first well itself, include(s) a mechanism for introducing the first oil recovery formulation into the formation. Alternatively, the first oil recovery formulation may flow from the oil recovery formulation storage facility 215 directly to the injection well 201 for injection into the formation 205, where the first well comprises a mechanism for introducing the first oil recovery formulation into the formation. The mechanism for introducing the first oil recovery formulation into the formation 205 via the injection well 201—located in the injection facility 217, the injection well 201, or both—may be comprised of a pump 221 for delivering the first oil recovery formulation to perforations or openings in the first well through which the first oil recovery formulation may be introduced into the formation.

The pressure at which the first oil recovery formulation may be injected into the formation may range from 5% to 95%, or from 10% to 90%, of the fracture pressure of the formation. Alternatively, the first oil recovery formulation may be injected into the formation at a pressure equal to, or greater than, the fracture pressure of the formation.

In certain embodiments, the volume of oil recovery formulation injected (i.e., the volume of both the first and second oil recovery formulations) may be from 0.1 to 1.0 pore volumes, for example, the volume of oil recovery formulation injected may be from 0.2 to 0.5 pore volumes, where the term "pore volume" refers to the volume of the formation that may be swept by the oil recovery formulation between the injection well 201 and the production well 203. In certain embodiments, the volume of first oil recovery formulation injected into the well and the volume of the second oil recovery formulation may be about equal. In other embodiments, the total oil recovery formulation may be comprised of 20% to 80% first oil recovery formulation, and 20% to 80% second oil recovery formulation.

As the first oil recovery formulation is introduced into the formation 205, the first oil recovery formulation spreads into the formation as shown by arrows 223. Upon introduction to the formation 205, the first oil recovery formulation contacts and forms a mixture with a portion of the oil in the formation. The first oil recovery formulation may mobilize the oil in the formation upon contacting and mixing with the oil and water in the formation. The first oil recovery formulation may mobilize the oil in the formation upon contacting and mixing with the oil, for example, by reducing capillary forces retaining the oil in pores in the formation, by reducing the interfacial tension between oil and water in the formation, and/or by forming a microemulsion with oil and water in the formation.

A portion of the surfactant may adsorb from the first oil recovery formulation on to the formation, reducing the amount of surfactant in the first oil recovery formulation. As discussed above, this reduction of the amount of surfactant may cause the mixture of formation oil and the first oil recovery formulation to become over-optimum, where the surfactant is more soluble in oil, which may increase interfacial tension of the mixture. The second (under-optimum) oil recovery formulation may be injected into the formation 205 following the first oil recovery formulation. For example, the second oil recovery formulation may be injected into the formation 205 as described above in connection with the first oil recovery formulation. The second oil recovery formulation may mix with the first oil recovery formulation to form a combination oil recovery formulation. In certain embodiments, the combination oil recovery formulation may mix with the oil in the formation to form a mixture comprising a Winsor type-III microemulsion. In certain embodiments, surfactant adsorbed onto the formation from the first oil recovery formulation may substantially satisfy an adsorption potential of the formation. As such, in certain embodiments, minimal surfactant may adsorb from the stable optimum oil recovery formulation (which results from mixing of the first oil recovery formulation and the second oil recovery formulation with oil in the formation). Injection of the second oil recovery formulation may also push oil and water across the formation 205 from the injection well 201 to the production well 203.

Oil may be mobilized for production from the formation 205 via the production well 203 by introduction of the first and second oil recovery formulations into the formation, where the mobilized oil is driven through the formation for production from the second well as indicated by arrows 229 by introduction of the first and second oil recovery formulations into the formation via the injection well 201. The oil mobilized for production from the formation 205 may include the mobilized oil/combined oil recovery formulation mixture. Water and/or gas may also be mobilized for production from the formation 205 via the production well 203 by introduction of the first and second oil recovery formulations into the formation via the injection well 201.

After introduction of the first and/or second oil recovery formulation into the formation 205 via the injection well 201, oil may be recovered and produced from the formation via the production well 203. The system of the present invention may include a mechanism located at the production well for recovering and producing the oil from the formation 205 subsequent to introduction of the first and/or second oil recovery formulation into the formation, and may include a mechanism located at the second well for recovering and producing the combined oil recovery formulation, water, and/or gas from the formation subsequent to introduction of the first and second oil recovery formulations into the formation. The mechanism located at the production well 203 for recovering and producing the oil, and optionally for recovering and producing the combined oil recovery formulation, water, and/or gas may be comprised of a pump 233, which may be located in a production facility 231 and/or within the production well 203. The pump 233 may draw the oil, and optionally the combined oil recovery formulation, water, and/or gas from the formation 205 through perforations in the production well 203 to deliver the oil, and optionally the combined oil recovery formulation, water, and/or gas, to the production facility 231.

Alternatively, the mechanism for recovering and producing the oil—and optionally the combined oil recovery formulation, water, and/or gas—from the formation 205 may be comprised of a compressor 234 that may be located in the production facility 231. The compressor 234 may be fluidly operatively coupled to a gas storage tank 241 via conduit 236, and may compress gas from the gas storage tank for injection into the formation 205 through the production well 203. The compressor may compress the gas to a pressure sufficient to drive production of oil—and optionally the combined oil recovery formulation, water, and/or gas—from the formation via the production well 203, where the appropriate pressure may be determined by conventional methods known to those skilled in the art. The compressed gas may be injected into the formation from a different position on the production well 203 than the well position at which the oil—and optionally the oil recovery formulation, water, and/or gas—are produced from the formation, for example, the compressed gas may be injected into the formation at formation portion 207 while oil, combined oil recovery formulation, water, and/or gas are produced from the formation at formation portion 209.

Oil, optionally in a mixture with the combined oil recovery formulation, water, and/or gas may be drawn from the formation 205 as shown by arrows 229 and produced up the production well 203 to the production facility 231. The oil may be separated from the combined oil recovery formulation, water, and/or gas in a separation unit 235 located in the production facility 231 and operatively fluidly coupled to the mechanism 233 for producing oil and, optionally, the combined oil recovery formulation, water, and/or gas, from the formation. The separation unit 235 may be comprised of a conventional liquid-gas separator for separating gas from the oil, combined oil recovery formulation, and water; and a conventional hydrocarbon-water separator including a de-emulsification unit for separating the oil from water and water soluble components of the combined oil recovery formulation. The ease of separation of oil from the water and combined oil recovery formulation may be enhanced relative to oil/water/surfactant separation in an SP oil recovery process due to recovery of a substantial portion of the oil in an oil bank rather than in a microemulsion. Surfactant(s) of the first and second surfactant formulations of the first and second oil recovery formulation, respectively, may also be recovered in the separation unit 235, where more surfactant may be recovered in the "under optimum salinity" oil recovery process of the present invention relative to conventional SP oil recovery processes due to reduced loss of surfactant in the formation.

The separated produced oil may be provided from the separation unit 235 of the production facility 231 to an oil storage tank 237, which may be fluidly operatively coupled to the separation unit 235 of the production facility by conduit 239. The separated gas, if any, may be provided from the separation unit 235 of the production facility 231 to the gas storage tank 241, which may be fluidly operatively coupled to the separation unit 235 of the production facility 231 by conduit 243.

In an embodiment of an oil recovery process of the present invention, the injection well 201 may be used for injecting the first and second oil recovery formulations into the formation 205 and the production well 203 may be used to produce oil from the formation as described above for a first time period, and the production well 203 may be used for injecting the first and second oil recovery formulations into the formation 205 to mobilize the oil in the formation and drive the mobilized oil across the formation to the first well and the injection well 201 may be used to produce oil from the formation for a second time period, where the second time period is subsequent to the first time period. The production facility 231 may comprise a mechanism such as pump 251 that is fluidly operatively coupled the oil recovery formulation storage facility 215 by conduit 253, and that is fluidly operatively coupled to the production well 203 to introduce the first and second oil recovery formulations into the formation 205 via the second well. The injection facility 217 may comprise a mechanism such as pump 257 or compressor 258 fluidly operatively coupled to the gas storage tank 241 by conduit 242 for production of oil, and optionally the combined oil recovery formulation, water, and/or gas from the formation 205 via the injection well 201. The injection facility 217 may also include a separation unit 259 for separating produced oil, combined oil recovery formulation, water, and/or gas. The separation unit 259 may be comprised of a conventional liquid-gas separator for separating gas from the produced oil and water; and a conventional hydrocarbon-water separator for separating the produced oil from water and water soluble components of the combined oil recovery formulation, where the hydrocarbon-water separator may comprise a de-emulsifier. The separation unit 259 may be fluidly operatively coupled to: the oil storage tank 237 by conduit 261 for storage of produced oil in the oil storage tank; and the gas storage tank 241 by conduit 265 for storage of produced gas in the gas storage tank.

As such, injection of a first SP oil recovery formulation into a formation followed by a second SP oil recovery formulation as described herein may allow oil within the formation to be recovered more efficiently than using a single SP oil recovery formulation without correcting for adsorption of the surfactant. As an example only, 0.2 pore volumes of a first SP oil recovery formulation comprising 0.36% ENORDET J771 surfactant, 0.24% ENORDET O332 surfactant, a polymer, and seawater may be injected into a formation, followed by 0.2 pore volumes of a second SP oil recovery formulation comprising 0.21% ENORDET J771 surfactant, 0.39% ENORDET O332 surfactant, a polymer, and seawater followed by injection of seawater may allow production of 44% of the formation oil after injection of 1 pore volume. On the other hand, by example only, injection of 0.4 pore volumes of an SP oil recovery formulation comprising 0.36% ENORDET J771 surfactant, 0.24% ENORDET O332 surfactant, a polymer, and seawater followed by injection of seawater may allow production of 36% of the formation oil after injection of 1 pore volume.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems, methods, and compositions are described in terms of "comprising," "containing," or "including" various components or steps, the systems, methods, and compositions can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

The invention claimed is:

1. A process for recovering oil from an oil-bearing formation, comprising:
   providing a first oil recovery formulation comprising a first surfactant formulation;
   injecting the first oil recovery formulation into the oil-bearing formation via an injection well thereby creating an oil-water interfacial tension less than 0.01 mN/m in a mixture of the first oil recovery formulation and oil of the formation;
   providing a second oil recovery formulation comprising a second surfactant formulation, where the second surfactant formulation has a higher solubility in water than the first surfactant formulation and creates an interfacial tension of more than 0.01 mN/m in a mixture of the second oil recovery formulation and formation oil;
   subsequent to the injecting of the first oil recovery formulation into the oil-bearing formation, injecting the second oil recovery formulation into the oil-bearing formation via the injection well wherein combining the second oil recovery formulation with the mixture of the first oil recovery formulation and oil within the oil-bearing formation creates an oil-water interfacial tension less than 0.01 mN/m; and
   producing oil to a production well after injection of the first oil recovery formulation and the second oil recovery formulation into the formation.

2. The method of claim 1, wherein the first oil recovery formulation and the second oil recovery formulation are aqueous.

3. The method of claim 1, wherein the first oil recovery formulation has a total dissolved solids content within 10 wt. % of the total dissolved solids content of the second oil recovery formulation.

4. The method of claim 1, wherein the first oil recovery formulation comprises divalent cations in a concentration of at least 50 mg/L.

5. A process for recovering oil from an oil-bearing formation comprising:
   providing a first oil recovery formulation comprising a first water and a first surfactant formulation mixed in the first water;
   introducing the first oil recovery formulation into the oil-bearing formation, wherein the first oil recovery formulation creates an oil-water interfacial tension less than 0.01 mN/m in a mixture with oil of the formation;
   adsorbing surfactant from the first oil recovery formulation into the oil-bearing formation, wherein sufficient surfactant is adsorbed from the first oil recovery formulation to remove a mixture of the first oil recovery formulation and oil of the formation from an oil and water mixture having an oil-water interfacial tension less than 0.01 mN/m;
   providing a second oil recovery formulation comprising a second water and a second surfactant formulation mixed in the second water, wherein the second surfactant formulation is more hydrophilic than the first surfactant formulation and creates an interfacial tension of more than 0.01 mN/m in a mixture of the second oil recovery formulation and formation oil;
   subsequent to the introducing of the first oil recovery formulation into the oil-bearing formation, combining the second oil recovery formulation with the mixture of the first oil recovery formulation and oil within the oil-bearing formation to create an oil-water interfacial tension less than 0.01 mN/m; and
   producing oil from the oil-bearing formation after combining the first oil recovery formulation and the second oil recovery formulation with oil in the oil-bearing formation.

* * * * *